Figure 1:
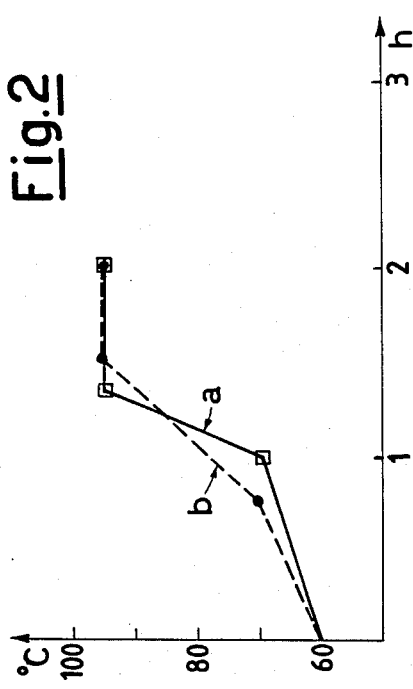

United States Patent [19]

Renzi et al.

[11] Patent Number: 4,835,233

[45] Date of Patent: May 30, 1989

[54] LIQUID POLYMERIZABLE COMPOSITIONS FOR THE PRODUCTION OF SUBSTITUTES FOR OPTICAL GLASSES

[75] Inventors: Fiorenzo Renzi, Milan; Franco Rivetti, Schio; Ugo Romano, Vimercate, all of Italy

[73] Assignee: Enichem Sintesi S.P.A., Palermo, Italy

[21] Appl. No.: 237,664

[22] Filed: Aug. 25, 1988

Related U.S. Application Data

[63] Continuation of Ser. No. 942,381, Dec. 16, 1986, abandoned.

[30] Foreign Application Priority Data

Dec. 19, 1985 [IT] Italy ............................... 23289 A/85

[51] Int. Cl.⁴ ........................ C08F 26/02; C08F 18/24
[52] U.S. Cl. .................................. 526/301; 526/314; 350/409
[58] Field of Search ................. 526/301, 314; 350/409

[56] References Cited

U.S. PATENT DOCUMENTS

| | | | |
|---|---|---|---|
| 3,658,801 | 4/1972 | Berry et al. | 526/314 |
| 4,205,154 | 5/1980 | Stevens | 526/314 |
| 4,521,577 | 6/1985 | Romano et al. | 526/314 |
| 4,622,376 | 11/1986 | Misura et al. | 526/286 |
| 4,623,708 | 11/1986 | Ezrielev et al. | 526/314 |

FOREIGN PATENT DOCUMENTS 56-61412  5/1981  Japan ................................. 526/314

Primary Examiner—Joseph L. Schofer
Assistant Examiner—N. Sarofim
Attorney, Agent, or Firm—Morgan & Finnegan

[57] ABSTRACT

A liquid, fluid composition, containing:
(a) bis(allylcarbonate) of monomer diethylene glycol;
(b) bis(allylcarbonate) of oligomer diethylene glycol;
(c) tris(allylcarbonate) of monomer tris(hydroxyethyl)isocyanurate;
(d) a monofunctional, unsaturated vinyl or methacryl ester monomer, is polymerized inside a mould (casting process), with fast polymerization cycle, to yield optical articles.

4 Claims, 2 Drawing Sheets

LIQUID POLYMERIZABLE COMPOSITIONS FOR THE PRODUCTION OF SUBSTITUTES FOR OPTICAL GLASSES

This is a continuation of co-pending application Ser. No. 942,381, filed on Dec. 16, 1956, now abandoned.

The present invention relates to an allylcarbonates-based liquid composition, which can be converted into optical articles, by the casting technology and with fast hardening cycle.

In the field of the substitutes for the optical glasses, the products are interesting which derive from the polymerization of glycol bis(allylcarbonates), and in particular of diethylene glycol bis(allylcarbionate), and this in view of the optical and mechanical characteristics of the related polymerization products, which are hence used in manufacturing sheets and ophthalmic and safety lenses.

In this regard, reference is made to the following technical literature: F. Strain, "Encyclopaedia of Chemical Processing and Design", 1st Ed., Dekker Inc, New York, II Vol., pages 452-foll.; "Encyclopaedia of Polymer Science and Technology", Vol. I, Interscience Publishers, New York, 1964, pages 799-foll.; and European Patent Appln. publ. No. 35 304.

In practice, the subject optical articles are usually prepared by the casting technology, by polymerizing mixtures containing diethylene glycol bis(allyl carbonate) and a free-radical initiator, inside a glass mould having a shape corresponding to that of the article which one wants to produce.

In the art, also liquid, polymerizable compositions have been described, which contain diethylene glycol bis(allyl carbonate), and are capable of being cast, with low volume shrinking, producing optical articles endowed with improved characteristics, in particular as relates to the impact strength.

One of such compositions is disclosed in the U.S. patent application Ser. No. 863.526 filed on May 15, 1986, in the same Applicant's name. In particular, this composition, which is formed by bis(allylcarbonate) of monomer and oligomer diethylene glycol, besides by a monomer of tris(hydroxyethyl)isocyanurate tris(allylcarbonate), shows the additional advantage of a good fluidity under the ambient conditions, which makes it easier to be handled during the casting process.

It has been found now that the addition of a monofunctional, unsaturated vinyl or acryl ester monomer to the composition of the above cited U.S. patent application to to similar compositions, allows the compositions to be given characteristics of still higher fluidity under the ambient conditions, and of an unexpectedly short polymerization cycle, and that with the advantaged relating to the low volume shrinkage during the polymerization, and those relating to the optical and mechanical characteristics of the articles produced to be maintained.

In accordance with the above, the present invention relates to a composition containing diethylene glycol bis(allyl carbonate), fluid under the ambient conditions and polymerizable by short polymerization cycles to optical articles having good optical and mechanical characteristics, formed by:

(A) from 0 to 40% by weight of bis(allylcarbonate) of monomer diethylene glycol
(B) from 20 to 60% by weight of bis(allylcarbonate) of oligomer diethylene glycol

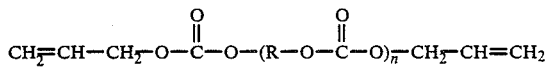

wherein R is the radical of diethylene glycol, and n has a value, or an average value, of from 2 to 5;
(C) from 10 to 40% by weight of tris(allylcarbonate) of monomer tris(hydroxyethyl)isocyanurate;
(D) from 5 to 30% by weight of a monofunctional, unsaturated vinyl or methacryl ester monomer;
the composition containing furthermore at least a free-radical polymerization initiator, in an amount of from 1 to 6% by weight, relatively to the total of the weights of (A), (B), (C) and (D) components.

The (A) component of the liquid, polymerizable composition of the present invention is bis(allylcarbonate) of monomer diethylene glycol, having the formula

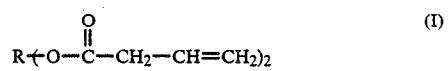

wherein R is the radical of diethylene glycol.

This component can be prepared by means of the reaction of diallylcarbonate with diethylene glycol, in a molar ratio to each other equal to or higher than about 10/1, by working in the presence of a basic catalyst, e.g., according to as disclosed in European patent application publ. No. 35,304. Under these conditions, a reaction product is obtained, which is constituted by at least 80–90% by weight by compound (I), the balance to 100% being constituted by oligomers of diethylene glycol bis(allylcarbonate). Thus, the component (A) of the polymerizable, liquid composition can be constituted by the compound (I) alone, or by a mixture containing at least about 80–90% by weight of compound (I), the balance to 100% being constituted by its oligomers.

In the preferred form of practical embodiment, the component (A) is present in the liquid, polymerizable composition in an amount of from 10 to 35% by weight.

The (B) component of the liquid, polymerizable composition of the present invention is an oligomer or a mixture of oligomers of bis(allylcarbonate) of diethylene glycol, definable by the formula:

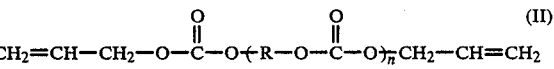

wherein R is the radical of diethylene glycol, and n has a value, or an average value, comprised between the range of from 2 to 5.

This component can be prepared by reacting diallylcarbonate with diethylene glycol, in a molar ratio to each other of the order of about 2/1, by operating in the presence of a basic catalyst, in a similar way to as for above (A) component.

Under these conditions, an essentially oligomeric reaction product is obtained, which corresponds to the above formula (II), with an average value of n of the order of 3, and is constituted by about 60–70% by weight by oligimers, the balance to 100% being constituted by bis(allylcarbonate) of monomer diethylene glycol.

In the preferred form of practical embodiment, the (B) component is present in an amount of from 25 to 50% by weight.

The (C) component of the liquid, polymerizable composition of the present invention is tris(allylcarbonate) of monomer tris(hydroxyethyl)isocyanurate, to be defined by the formula:

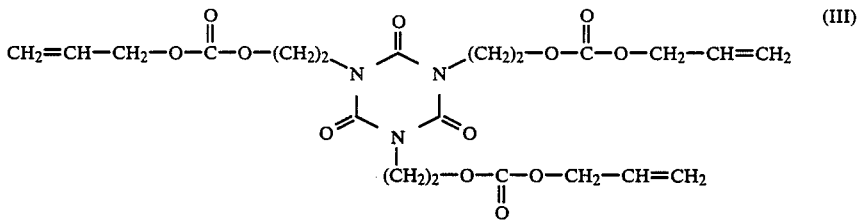

This component can be prepared by reacting diallylcarbonate with tris(hydroxyethyl)isocyanurate, in a molar ratio to each other higher than about 10/1, by operating in the presence of a basic catalyst, in a similar way as for the above (A) component.

Under these conditions, a reaction product is obtained, which is constituted by at least 60-70% by weight of compound (III), the balance to 100% being constituted by oligomers of tris(hydroxyethylisocyanurate) tris(allylcarbonate).

Thus, the (C) component of the liquid, polymerizable composition can be constituted by component (III) only, or it can be constituted by a mixture containing at least about 60-70% by weight of component (III), the balance to 100% being constituted by its oligomers.

In the preferred form of practical embodiment, the (C) component is present in the liquid, polymerizable composition in an amount of from 20 to 35% by weight.

The (D) component of the liquid, polymerizable composition of the present invention is an unsaturated, monofunctional vinyl or methacryl ester monomer, generally selected from vinyl acetate and methyl methacrylate which, in the preferred form of practical embodiment, is present in the composition in an amount of from 5 to 20% by weight.

The liquid, polymerizable composition of the present invention contains furthermore one or more polymerization initiators, soluble in the same composition, and capable to generate free radicals within a temperature range of from 30° to about 100° C. Non-limitative examples of such initiators are diisopropylperoxydicarbonate, dicyclohexylperoxydicarbonate, di-sec-butylperoxydicarbonate, dibenzoylperoxide and tert-butylperbenzoate.

In the preferred form of practical embodiment, the polymerization initiator in present in an amount of from 2 to 5% by weight, relatively to the total of the weights of (A), (B), (C) and (D) components.

The liquid, polymerizable composition of the present invention may additionally contain one or more conventional additive(s), such as stabilizers, release agents, dyes, pigments, UV-light or IR-light absorbers, and the like, however in a total amount not higher than 1% by weight relatively to the total of the weights of (A), (B), (C) and (D) components.

The liquid, polymerizable composition of the present invention is fluid under ambient conditions, and is transformed, by means of the casting process, into such optical articles as sheets, ophthalmic and safety lenses. The polymerization is initiated by free radicals, generated by the decomposition of the polymerization initiators present in the same composition, by generally operating at temperatures of from 40° to 100° C.

Under these conditions, the times necessary for the complete polymerization of the composition are comprised within the range of from 1 to 5 hours, in particular as a function of the shape and of the dimensions of the article to be manufactured, with neither composition prepolymerization treatments, nor post-treatments of the manufactured article after the mould opening being required.

Furthermore, the polymerization occurs with reduced shrinking phenomena, and the obtained articles show a whole of particularly favourable optical and mechanical properties, as well as the complete absence of the typical faults, peculiar of the articles manufactured by starting from the compositions of the prior art, when said known compositions are submitted to accelerated polymerization cycles.

In the following experimental Examples, given to the only purpose of illustrating, without limiting, the present invention, the following components have been used for the liquid, polymerizable composition:

(A) bis(allylcarbonate) of monomer diethylene glycol: reaction product of diallylcarbonate with diethylene glycol, in a molar ratio to each other of 12/1, by operating according to as disclosed in European patent application publ. No. 35,304. This product contains about 85-90% by weight of bis(allylcarbonate) of diethylene glycol (I), the balance to 100% being constituted by oligomers thereof;

(B) bis(allylcarbonate) of oligomer diethylene glycol: reaction product of diallylcarbonate with diethylene glycol, in a molar ratio to each other of 2/1, by operating according to as disclosed in the above cited European patent application. This product corresponds to formula (II), with an average n value of about 3, the contents of monomer being of the order of 35% by weight;

(C) tris(allylcarbonate) of monomer tris(hydroxyethyl)isocyanurate: reaction product of diallylcarbonate with tris(hydroxyethyl)isocyanurate, in a molar ratio to each other of 12/1, by operating according to as disclosed in the cited European patent application;

(D) vinyl acetate.

The (A), (B), (C) and (D) components are mixed in the hereunder shown ratios, and dicyclohexylperoxydicarbonate (DCPC) is then added to their mixture, at a constant concentration of 4% by weight relatively to the same composition.

By said composition, different types of lenses are prepared, by pouring into and polymerization inside such glass moulds, as customary used in the industrial practice. The polymerization of the composition is carried out in a temperature-controlled water bath, by variable time-temperature cycles, according to the type of lens being manufactured.

EXAMPLE 1

A liquid, polymerizable composition according to the invention (composition 1) and two comparison polymerizable compositions (compositions 2 and 3) according to the prior art are prepared, as reported in Table 1.

TABLE 1

| Composition | 1 | 2 | 3 |
|---|---|---|---|
| (A) Component (% by weight) | 32 | 96 | 35.5 |
| (B) Component (% by weight) | 32 | — | 35.5 |
| (C) Component (% by weight) | 22 | — | 25 |
| (D) Component (% by weight) | 10 | — | — |
| DCPD (% by weight) | 4 | 4 | 4 |

The viscosity of the three compositions, in the absence of DCPD, is respectively of 28, 14 and 83 centistokes, at the temperature of 25° C.

From such a compositions, neutral lenses of 1.8 mm in thickness and 75 mm in diameter are prepared, by polymerization according to the time-temperature cycle as shown in FIG. 1. To comparative purposes, the same compositions are polymerized by a cycle of 72 hours at 48° C., followed by two hours at 110° C. (for the post-crosslinking), under which conditions the polymerized materials reach their highest conversion degree.

On the polymerized lenses, prepared by both of the above-described thermal cycles, the following characteristics are evaluated:

Rockwell (M) hardness, as measured by the Rockwell durometer, at lens centre (ASTM D-785);
Yellow index (YI(, defined as:

$$-YI = \frac{100}{y} \cdot (1.277\,X - 1.06\,Z)$$

as determined by the Gardner XL805 colorimeter (ASTM D-1925)
Haze (%) and visible transmittance (%), as measured by the Gardner XL-211 Hazegard (ASTM D-1003).

The results are shown in Table 2, wherein the first values are those obtained by the time-temperature cycle of FIG. 1, and the values in brackets are those obtained by the 74-hrs polymerization cycle.

TABLE 2

|  | Composition 1 | Composition 2 | Composition 3 |
|---|---|---|---|
| Rockwell (M) Hardness | 89 (93) | <50 (91) | 72 (93) |
| Yellow Index YI | 0.37 (0.76) | 0.55 (0.76) | 0.57 (0.86) |
| Haze (%) | 0.10 (0.12) | 0.08 (0.07) | 0.12 (0.09) |
| Visible Transmitance (%) | 93.1 (93.1) | 93.2 (93.1) | 93.0 (92.9) |
| Appearance | good | fractures | good |

EXAMPLE 2

Figure 2:
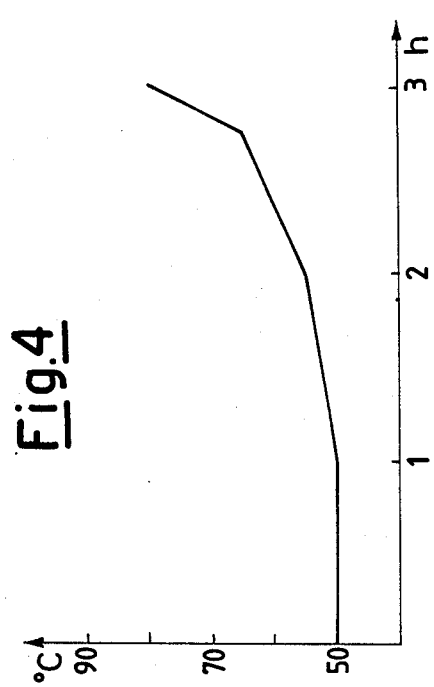

With the composition 1 of Example 1, two neutral lenses of 1.8 mm in thickness, and 75 mm in diameter, are prepared, by carrying out the polymerization by two different time-temperature cycles—(a) and (b) cycle—each cycle having an overall duration of two hours, according to the pattern as shown in FIG. 2.

By both of such cycles, lenses are obtained, which are free from faults and show good optical and mechanical characteristics, as shown in Table 3.

TABLE 3

|  | Cycle (a) | Cycle (b) |
|---|---|---|
| Rockwell (M) Hardness | 87 | 89 |
| Yellow Index (YI) | 0.38 | 0.39 |
| Haze (%) | 0.09 | 0.06 |
| Visible Transmittance (%) | 93.1 | 93.1 |

EXAMPLE 3

With the composition of Example 1, two finished, respectively +0.25 and +2.0 lenses of 70 mm in diameter are prepared, by means of the two time-temperature cycles as used in foregoing Example 2.

All of the lenses result free from faults and have the hardness values as shown in Table 4.

TABLE 4

|  | Rockwell (M) Hardness | |
|---|---|---|
|  | Cycle (a) | Cycle (b) |
| Lens +0.25 | 88 | 88 |
| Lens +2.0 | 94 | 92 |

EXAMPLE 4

Figure 3:
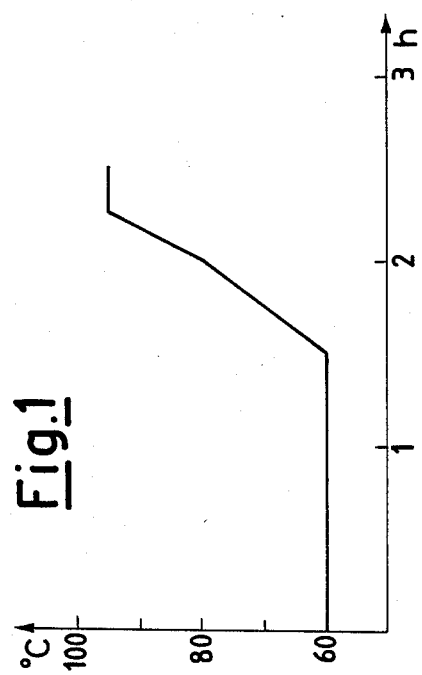

With the composition 1 of Example 1, three semifinished, bifocal lenses, with basic curvature of respectively 4.25; 6.25; and 8.25; and of 70 mm in diameter are prepared, by operating by a three-hours polymerization cycle, having the pattern as shown in FIG. 3.

To comparative purposes, from the same composition a semifinished bifocal lens with 6.25 basic curvature has been prepared, by operating by a polymerization cycle of 72 hours at 48° C., followed by two hours at 110° C. All of the lenses result free from faults and have the hardness values as shown in Table 5.

TABLE 5

|  | Rockwell (M) Hardness | |
|---|---|---|
|  | 3-Hrs Cycle | 74-Hrs Cycle |
| 4.25-Basis semifinished lens | 98 | — |
| 6.25-basis semifinished lens | 101 | 105 |
| 8.25-basis semifinished lens | 103 | — |

From the examination of the results, it can be inferred that the lenses prepared by the 3-hrs accelerated cycle result perfectly polymerized, with hardness values very close to those of the prolonged cycle.

EXAMPLE 5

A liquid, polymerizable composition (composition 4) is prepared, from:

| (A) Component | 26% by weight |
|---|---|
| (B) Component | 34% by weight |
| (C) Component | 26% by weight |
| (D) Component | 10% by weight |
| DCPD | 4% by weight |

The viscosity of the composition, in the absence of DCPD, is of 29 centistokes at 25° C.

From such a composition, a neutral lens of 1.8 mm in thickness and 75 mm in diameter, and two finished, respectively +0.25 and +2.0 lenses, of 70 mm in diameter, are prepared, by using the (b) polymerization cycle of Example 2, having the overall duration of 2 hours. To comparative purposes, lenses are prepared from the same composition, by a polymerization cycle of 72 hours at 48° C., followed by two hours at 110° C. All of the lenses result free from faults and have the hardness values as shown in Table 6.

TABLE 6

| | Rockwell (M) Hardness | |
|---|---|---|
| | 2-Hrs Cycle | 74-Hrs Cycle |
| Neutral Lens | 95 | 96 |
| +0.25 lens | 95 | 97 |
| +2.0 lens | 98 | 100 |

EXAMPLE 6

Figure 4:
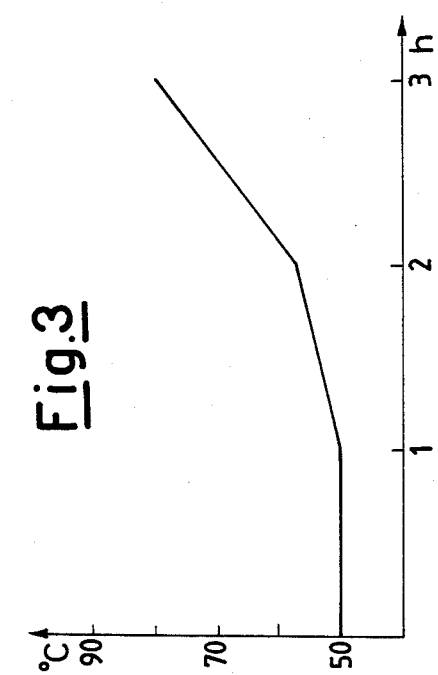

From the composition of above Example 5, three semifinished, bifocal lenses, of 70 mm in diameter and with basic curvature of respectively 4.25; 6.25; and 8.25 are prepared. The polymerization cycle used, of the overall duration of 3 hours, is shown in FIG. 4.

The obtained lenses are free from faults and have the hardness values as shown in Table 7.

TABLE 7

| | Rockwell (M) Hardness |
|---|---|
| 4.25-Basis semifinished lens | 96 |
| 6.25-basis semifinished lens | 101 |
| 8.25-basis semifinished lens | 102 |

EXAMPLE 7

Figure 5:
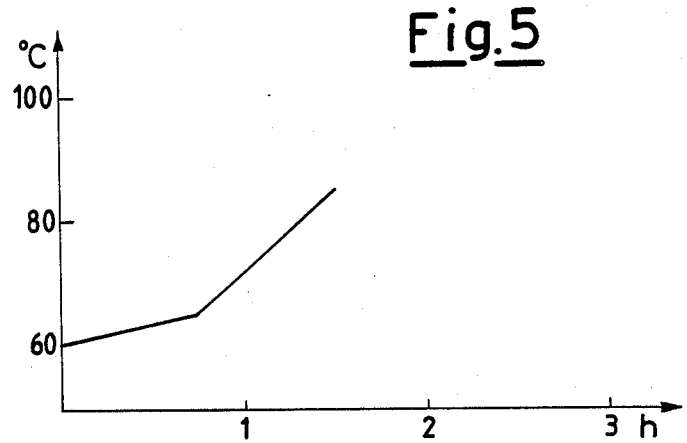

A set of finished lenses are prepared by means of the polymerization cycle of 1.5 hours of duration as shown in FIG. 5, by starting from the polymerizable liquid compositions as reported in Table 8.

TABLE 8

| Composition | 1 | 5 | 6 |
|---|---|---|---|
| (A) Component (% by weight) | 32 | 10 | — |
| (B) Component (% by weight) | 32 | 46 | 52 |
| (C) Component (% by weight) | 22 | 30 | 34 |
| (D) Component (% by weight) | 10 | 10 | 10 |
| DCPD (% by weight) | 4 | 4 | 4 |

All of the lenses result free from faults and with the hardness values as shown in Table 9.

TABLE 9

| | Rockwell (M) Hardness | | |
|---|---|---|---|
| | Composition 1 | Composition 5 | Composition 6 |
| Neutral lens (75 mm) | 87 | 89 | 90 |
| +0.25 lens (70 mm) | 83 | 85 | 89 |
| +2.0 lens (70 mm) | 97 | 97 | 98 |
| +3.0 lens (70 mm) | 98 | 99 | 100 |

EXAMPLE 8

Figure 6:
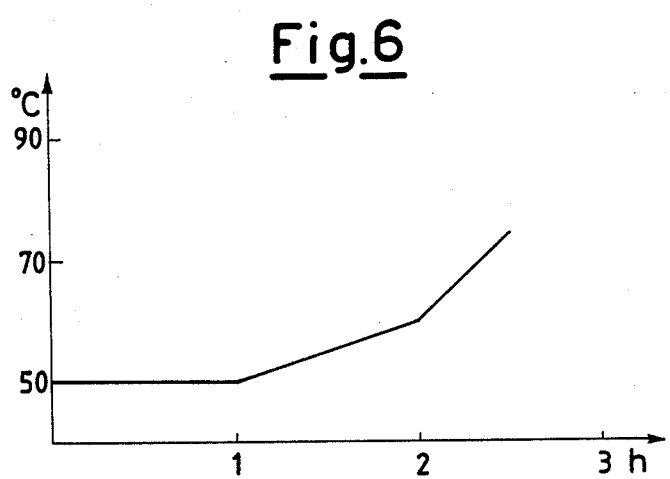

From the compositions of above Example 7, three semi-finished bifocal lenses, having 6.25 basic curvature and of 70 mm in diameter are prepared, by operating with a polymerization cycle of 2.5 hours, according to the pattern of FIG. 6.

All of the lenses result perfect, and with the hardness values as shown in Table 10.

TABLE 10

| | Rockwell (M) Hardness |
|---|---|
| Composition 1 | 97 |
| Composition 5 | 100 |
| Composition 6 | 103 |

We claim:
1. A liquid polymerizable composition of allylcarbonates, suitable to be converted into optical articles by a casting technique with fast polymerization cycle, comprising:
    (a) from about 10% by weight to about 35% by weight of a reaction product consisting of at least about 80% by weight of bis(allycarbonate) of diethylene glycol, the balance of said reaction product consisting substantially of oligomers of bis(allycarbonate) of diethylene glycol, said reaction product formed by reaction of diallycarbonate with diethylene glycol in a molar ratio of about 10:1;
    (b) from about 25% by weight to about 50% by weight of a bis(allylcarbonate) of oligomer diethylene glycol of the formula:

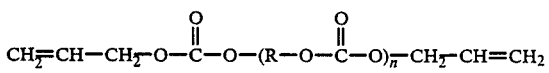

wherein R is a radical of diethylene glycol, and n has an average value of about 3, said bis(allylcarbonate) of oligomer diethylene glycol formed by reaction of diallycarbonate with diethylene glycol in a molar ratio of about 2:1;
    (c) from about 20% by weight to about 35% by weight of a reaction product consisting of at least about 60% by weight of tris(hydroxyethyl)isocyanurate tris(allylcarbonate), the balance of said reaction product consisting substantially of oligomers of tris(hydroxyethyl)isocyanurate tris(allycarbonate), said reaction product formed by reaction of diallycarbonate with tris(hydroxyethyl)isocyanurate in a molar ratio of about 10:1; and
    (d) from about 5% by weight to about 20% by weight of a monofunctional, unsaturated monomer selected from vinyl acetate and methyl methacrylate;
    the composition further comprising a free-radical polymerization initiator, in an amount of from about 2% by weight to about 5% by weight, relative to the total of the weights of the components of (a), (b), (c) and (d).

2. Composition according to claim 1, characterized in that the free-radical initiator is selected from diisopropylperooxydicarbonate, dicyclohexylperoxydicarbonate, di-sec-butylperoxydicarbonate, di-benzoylperoxide and tert-butylperbenzoate.

3. Composition according to clim 1, characterized in that it additionally contains one or more among stabilizers, release agents, dyes, pigments, UV-light or IR-light absorbers, in a total amount not higher than 1% by weight relatively to the total of the weights of (A), (B), (C) and (D) components.

4. Process for the preparation of optical articles characterized in that the composition according to any of claims 1, 2, or 3 is polymerized in a mould, at a temperature of from 40° to 100° C. for a time of from 1 to 5 hours.

* * * * *